(12) United States Patent
Weiss, II

(10) Patent No.: US 9,028,152 B2
(45) Date of Patent: May 12, 2015

(54) DIAPHRAGM SEAL FOR STRUT BEARING

(71) Applicant: Schaeffler Technologies AG & Co. KG, Herzogenaurach (DE)

(72) Inventor: Robert Weiss, II, Sterling Heights, MI (US)

(73) Assignee: Scheaffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 14/101,633

(22) Filed: Dec. 10, 2013

(65) Prior Publication Data

US 2014/0167360 A1 Jun. 19, 2014

Related U.S. Application Data

(60) Provisional application No. 61/736,711, filed on Dec. 13, 2012.

(51) Int. Cl.
F16C 33/76 (2006.01)
F16J 15/54 (2006.01)
F16J 15/32 (2006.01)
F16J 15/447 (2006.01)
B60G 15/06 (2006.01)

(52) U.S. Cl.
CPC ............. F16J 15/54 (2013.01); F16C 33/761 (2013.01); F16J 15/3272 (2013.01); F16J 15/4476 (2013.01); B60G 15/068 (2013.01); B60G 2204/128 (2013.01); B60G 2204/418 (2013.01)

(58) Field of Classification Search
CPC ...... F16C 33/761; F16J 15/54; B60G 15/068; B60G 2204/418
USPC .......................... 384/607; 277/500, 579, 910; 280/124.147
See application file for complete search history.

(56) References Cited

U.S. PATENT DOCUMENTS

| | | | |
|---|---|---|---|
| 3,762,785 A * | 10/1973 | Light | ............................ 384/607 |
| 3,934,480 A | 1/1976 | Nederlof | |
| 3,969,991 A | 7/1976 | Comstock et al. | |
| 4,332,397 A | 6/1982 | Steger | |
| 4,774,874 A | 10/1988 | Adahan | |
| 4,948,272 A | 8/1990 | Stowe | |
| 5,765,666 A | 6/1998 | Provence et al. | |
| 6,257,605 B1 | 7/2001 | Zernickel et al. | |
| 6,948,728 B2 | 9/2005 | Pflügner et al. | |
| 8,308,176 B2 * | 11/2012 | Lenon et al. | ........... 280/124.147 |
| 2011/0317954 A1 * | 12/2011 | Saunier | ........................ 384/607 |

* cited by examiner

Primary Examiner — Thomas R Hannon
(74) Attorney, Agent, or Firm — Antun M. Peakovic

(57) ABSTRACT

A rolling diaphragm seal for a strut bearing, the seal inserted into an annulus formed between an upper and lower housing. The seal having a hollow tubular form, formed into a ring open at one end. The seal rolling along a length thereof during relative rotation of the upper and lower housings. Alternatively, the seal can be a continuous hollow tubular form inserted between the upper and lower housings.

8 Claims, 6 Drawing Sheets

DIAPHRAGM SEAL FOR STRUT BEARING

The present invention relates to strut bearings, in particular, a diaphragm seal for a strut bearing.

BACKGROUND

MacPherson-style strut assemblies are well known in the automotive industry. Such assemblies typically comprise a strut which extends upward from the steering knuckle of the wheel and terminates in a top mount attached to the chassis of the vehicle. The strut includes a hydraulic cylinder and a spring for absorbing movement and bounce of the vehicle. The joint between the top mount and the strut contains a strut bearing. Typically, a strut bearing includes two relatively rotatable elements, for example an upper and lower housing made of plastic or metal, provided with a bearing arranged therebetween to facilitate rotation while at the same time permitting load transmission between the elements. The bearing can include rolling elements or a synthetic resin sliding bearing arrangement, both known in the art. The lower housing typically includes a spring seat, integrally formed, to support an upper end of the strut spring.

In order to ensure proper operation of the strut bearing, particularly of the rolling elements or sliding bearing, it is necessary to protect the bearing components from pollutants such as road dust and humidity. Several arrangements may prevent intrusion of dust and contaminants into the bearing, including a labyrinth or flinger type seal arrangement between the upper and lower housing, such as that shown in U.S. Pat. No. 6,948,728. Such configurations do not provide complete sealing and may allow contamination to enter the bearing portion of the strut. Alternatively, full contact seals, having lips directed toward the upper and lower housings, respectively, can be used and provide complete sealing. However, such configurations cause high friction during operation, which is generally undesirable.

Therefore, an intermediate solution, providing improved sealing, but, limiting frictional losses is needed.

SUMMARY OF THE INVENTION

Certain terminology is used in the following description for convenience and descriptive purposes only, and is not intended to be limiting to the scope of the claims. The terminology includes the words specifically noted, derivatives thereof and words of similar import.

The present invention relates to rolling diaphragm seal for a strut bearing. The strut bearing comprising an upper and lower housing, such that when superimposed, an annulus is formed at an outer radial perimeter. The annulus having a radially inner wall, a radially outer wall, an axial upper ledge extending radially outward between the inner and outer walls and an axial lower ledge extending radially outward between the inner and outer walls. The diaphragm seal formed in a hollow tubular shape, capped at two ends, and inserted into the annulus, contacting at least two surfaces. The seal rolling along a length of the seal during relative rotation of the upper and lower housings.

Another embodiment utilizes a non-rolling continuous diaphragm seal, with the same strut bearing structure described above.

BRIEF DESCRIPTION OF DRAWINGS

The above mentioned and other features and advantages of the embodiments described herein, and the manner of attaining them, will become apparent and be better understood by reference to the following description of at least one example embodiment in conjunction with the accompanying drawings. A brief description of those drawings now follows.

DETAILED DESCRIPTION OF THE INVENTION

Identically labeled elements appearing in different ones of the figures refer to the same elements but may not be referenced in the description for all figures. The exemplification set out herein illustrates at least one embodiment, in at least one form, and such exemplification is not to be construed as limiting the scope of the claims in any manner. "Upward" or "axially upward" refers to a direction from lower housing 3 to upper housing 2, with the corollary "downward" being the opposite direction. "Radially outward" refers to directions taken from the central axis of the assembly towards an outer circumferential surface, with the corollary "inward" being the opposite direction.

Figure 1:
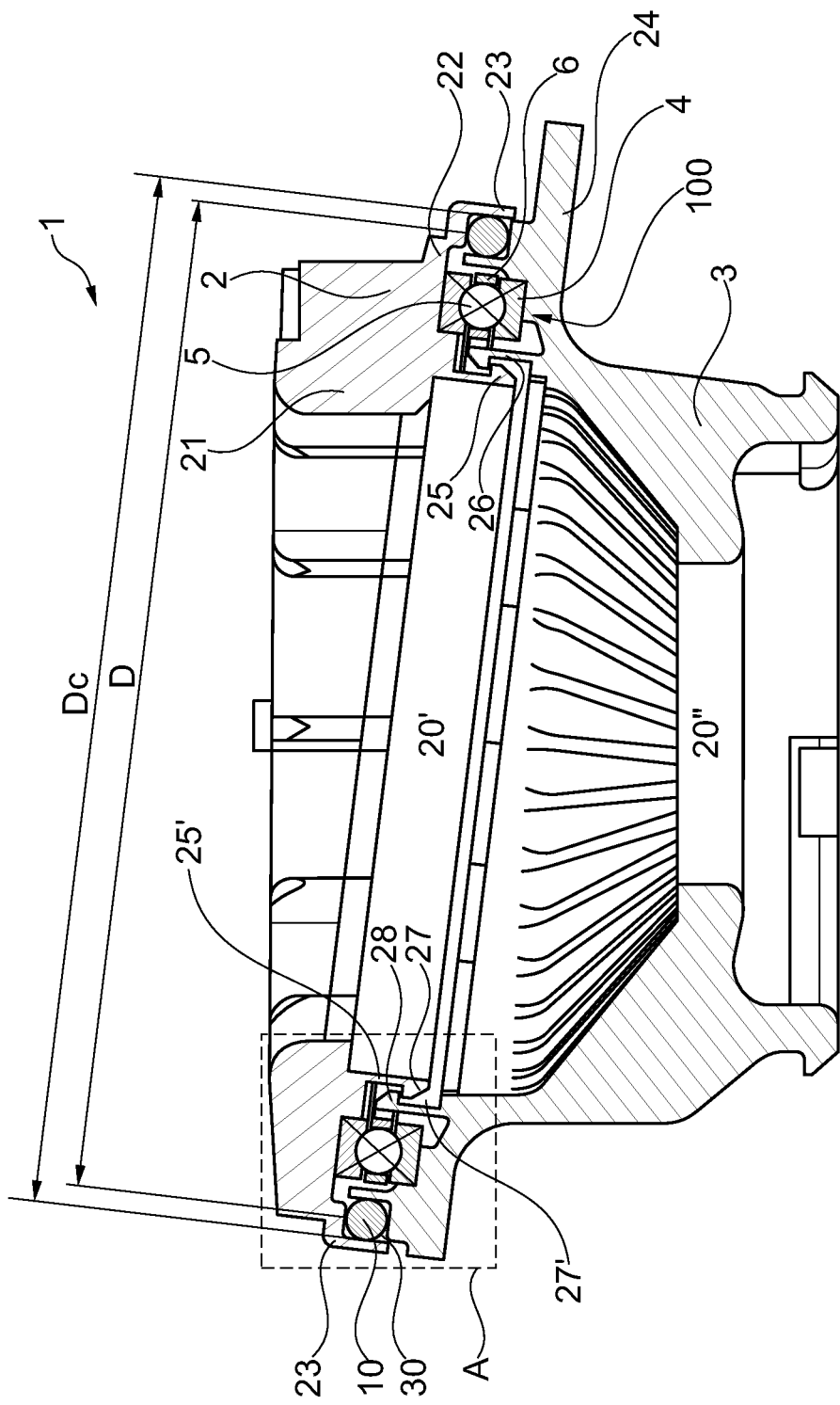
FIG. 1 is a cross sectional view of a strut bearing with diaphragm seal according to one embodiment of the invention.

FIG. 1 is a cross sectional view of strut bearing 1 according to one embodiment of the invention, comprising upper housing 2, lower housing 3, races 4, balls 5, cage 6 and diaphragm seal 10. Bearing 100, comprising races 4, balls 5 and cage 6, is known in the art, and may take any suitable form for a particular application, including, for example, the bearing disclosed in U.S. Pat. No. 6,257,605.

Although a wide variety of upper housing 2 and lower housing 3 arrangements are contemplated for use in conjunction with the invention, in the embodiment shown in FIG. 1, upper housing 2 comprises through hole 20', inner sleeve 21, upper clip 25 and upper radial ledge 22 extending at least to an uncompressed diameter Dc of the outer circumferential surface of seal 10. Upper housing 2 can also include shield extension 23 which can act to block contamination from entering the interior of bearing 1. Lower housing 3 comprises through hole 20", lower radial ledge 24 extending at least to an diameter Dc, and lower clip 26. In the embodiment shown, upper housing 2 is superimposed on lower housing 3, so as to mate the two housings together. Upper clip 25 has extending flange 25' and annular projection 27 extending radially outward, while lower clip 26 extends upward past projection 27 and, in turn, has a a projection 28 complementary to projection 27, extending radially inward to a diameter smaller than the end face 27' of projection 27, such that when upper housing 2 is superimposed on lower housing 3, projection 27 elastically deforms around projection 28 and the two nest approximately adjacent one another, providing additional retention of upper housing 2 to lower housing 3.

Figure 2:
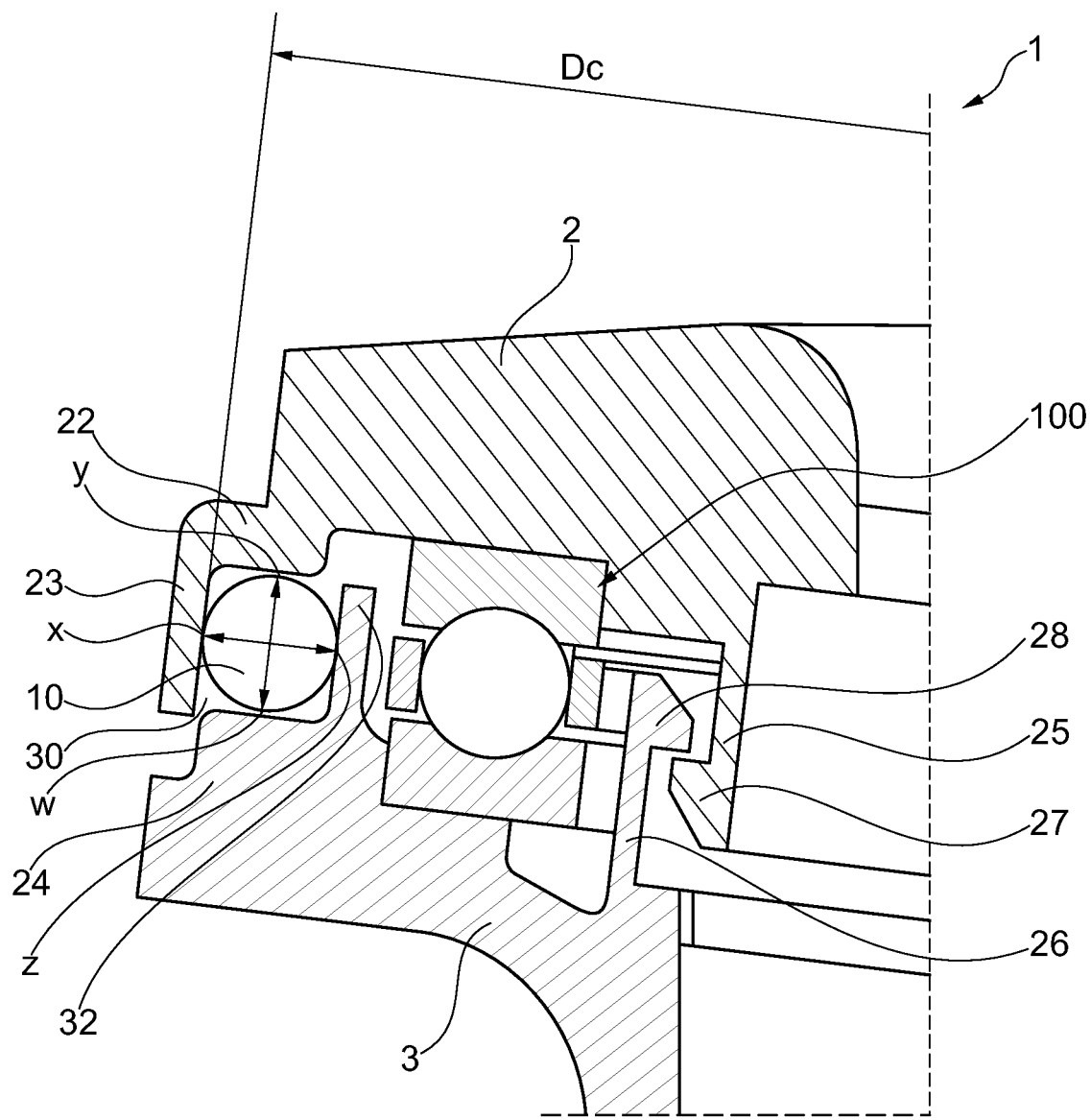
FIG. 2 is an enlarged cross-sectional view of portion A of FIG. 1.

When upper housing 2 is superimposed on lower housing 3, cylindrical annulus 30 is formed, with diaphragm seal 10 inserted therein. FIG. 2 shows an enlarged view of portion A of strut bearing 1 of FIG. 1, including upper housing 2, lower housing 3, upper clip 25 with projection 27, lower clip 26 with projection 28, races 4, balls 5 and cage 6. Upper housing 2 includes shield extension 23 radially outward from cylindrical annulus 30, extending from the upper end of annulus 30 to a position coincident with the bottom W of seal 10, but, not contacting lower radial ledge 24 of lower housing 3. Lower radial ledge 24, extends from radially inner sidewall 32, adjacent bearing 100, radially outward at least to a diameter Dc of the outer circumferential surface of seal 10.

Figure 3:
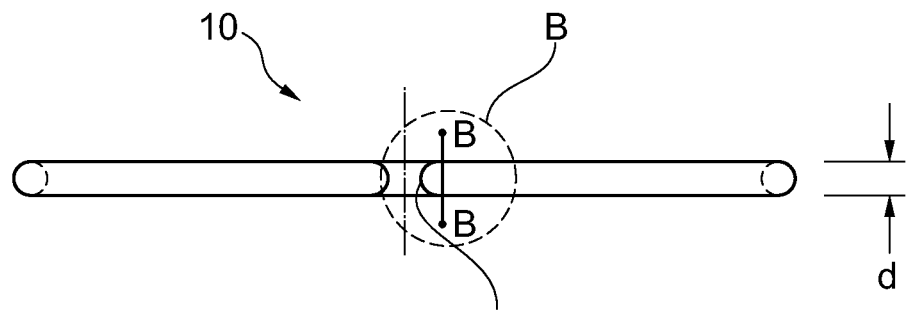
FIG. 3 is a side view of the diaphragm seal of FIG. 1.
Figure 4:
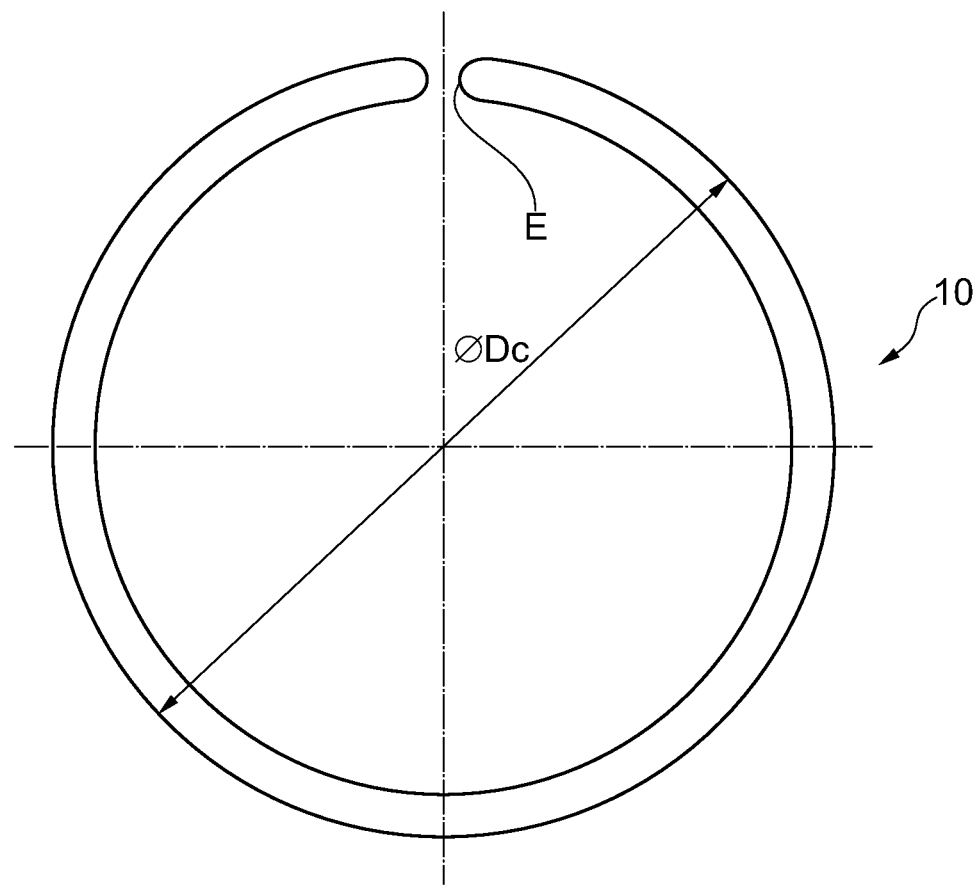
FIG. 4 is a top view of the diaphragm seal of FIG. 1.
Figure 5:
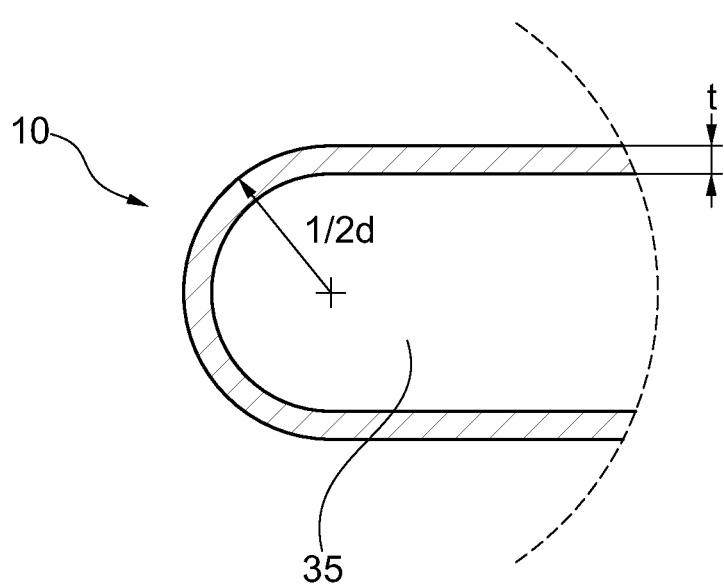
FIG. 5 is an enlarged cross sectional view taken along line B-B of portion B of the diaphragm seal of FIG. 3.

FIG. 3 shows a side view of diaphragm seal 10 of FIGS. 1 and 2 prior to assembly into bearing 100. FIG. 4 shows a top view of seal 10, showing outer (uncompressed) diameter Dc and end E. Seal 10 forms at least a 270 degree segment of a ring. FIG. 5 shows an enlarged cross sectional view of portion B of FIG. 3, including end E of diaphragm seal 10. In this embodiment, diaphragm seal 10 is a hollow flexible walled tubular non-continuous ring, the ring open at an end E, having uncompressed outer circumferential diameter Dc, wall thickness t and external thickness d. Seal 10 can be made of any suitable flexible material, such as rubber, fiber reinforced elastomer or certain types of plastic, which can permanently retain a fluid or gas within its interior cavity 35. End E of seal 10 is, of necessity, capped or closed, either at the time of molding or subsequently using a suitable permanent cap or closure arrangement, such as rubber, fiber reinforced elastomer, or plastic end cap or can be made of the same material as the remainder of the seal and formed into place. The embodiment shown has a formed cap made of the identical material as the remainder of the seal.

In an alternative embodiment, seal 10 can be a hollow tubular continuous ring, with fluid or gas later injected into interior cavity 35, and insertion perforation later permanently sealed, for example, by applying molten material of seal 10 to the perforation.

In another embodiment, seal 10 can be formed as a straight, hollow tube, and only formed into a ring when inserted into annulus 30 during assembly.

Dc of seal 10 is sized for a particular application requirement, namely based on the required diameter of upper housing 2 and lower housing 3, and exterior thickness d is based on available volume in annulus 30, in turn, based on space requirements of upper housing 2 and lower housing 3. Wall thickness t is based on material choice for seal 10, fluid choice and expected pressure differential between interior cavity 35 and atmosphere.

Seal 10 is inserted or placed on lower housing ledge 24 and upper housing 2 is superimposed thereon, encapsulating seal 10 between upper radial ledge 22, lower radial ledge 24, shield extension 23 and inner sidewall 32, preventing egress of seal 10 from strut bearing assembly 1. Upper housing 2 compresses seal 10 in the range of 5% to 95%, expanding seal 10 in both radial directions. Initial compression of seal 10 between upper housing 2 and lower housing 3 is accomplished during assembly, but, it is intended that a variable compression of seal 10 be accomplished depending on applied force and operating characteristics of the strut assembly 1 during operation. In fact, it is a desired operating characteristic of seal 10 that it is able to be flexible and adjust sealing, and resist pinching as a result of jounce, spring loading and/or manufacturing tolerance variations of housings 2 and 3.

Typically, strut bearings operate or rotate in a defined range, for example from 0 to 45 degrees of rotation. During operation, diaphragm seal 10 "rolls" within annulus 30 in that range, by rolling circumferentially around annulus 30, along with upper housing 2 during rotation cycles. Depending on operating characteristics, material from a top surface of seal 10, may be pushed or forced toward or away from end E, in turn, pulling material from a bottom surface of seal 10, thus cycling seal material from an upper to a lower surface and back to an upper surface depending on seal length and rotation of the associated housings 2 and 3. In an alternative operative mode, seal 10 can slide along one of the upper housing 2 or lower housing 3, in turn, shifting E around a circumference of bearing 1. In the embodiment shown in FIG. 3, open end E can be located in a more protected zone of strut bearing 1 relative to its surrounding environment.

Figure 6:
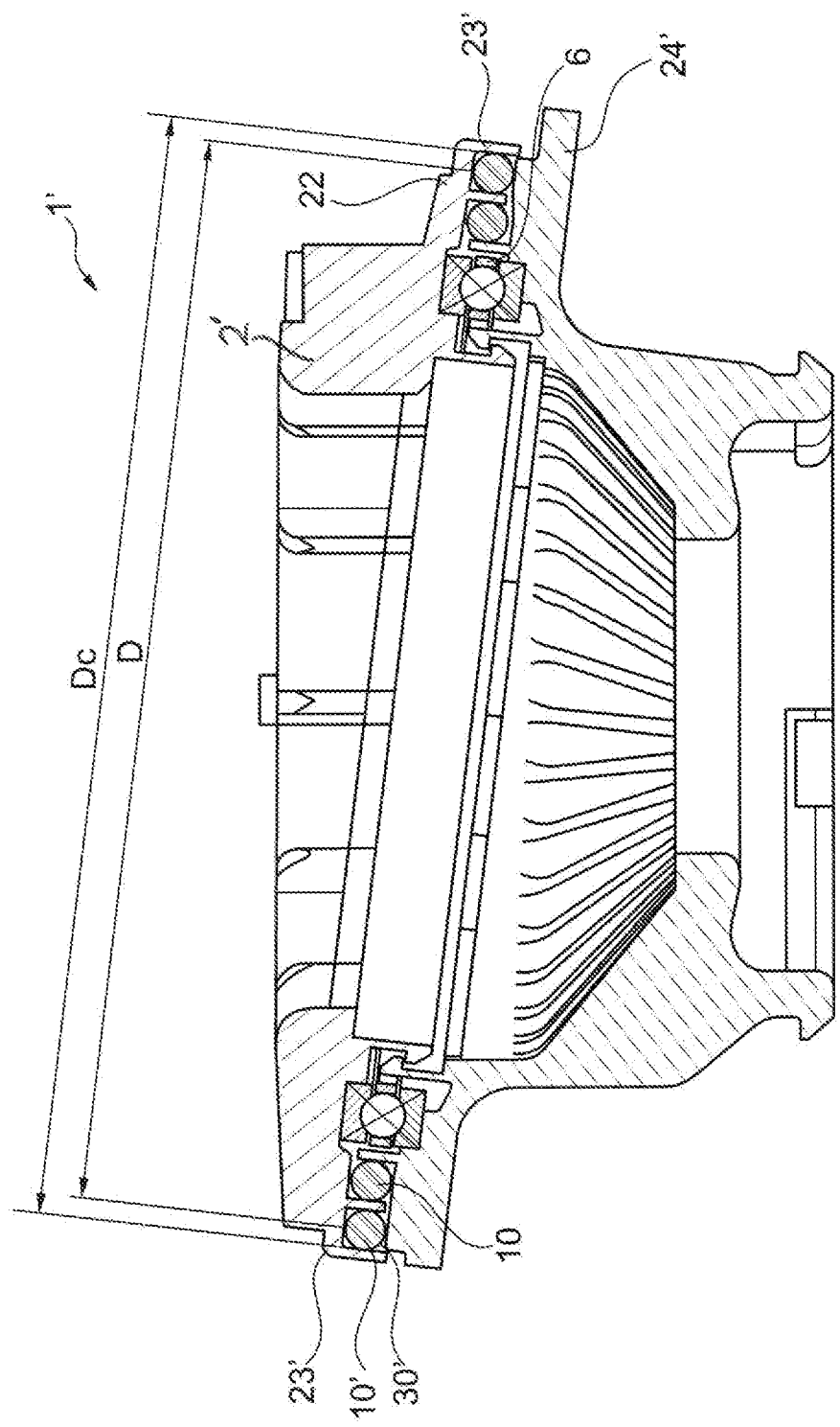
FIG. 6 is a cross sectional view of strut bearing with diaphragm seal according to another embodiment of the invention.
Figure 7:
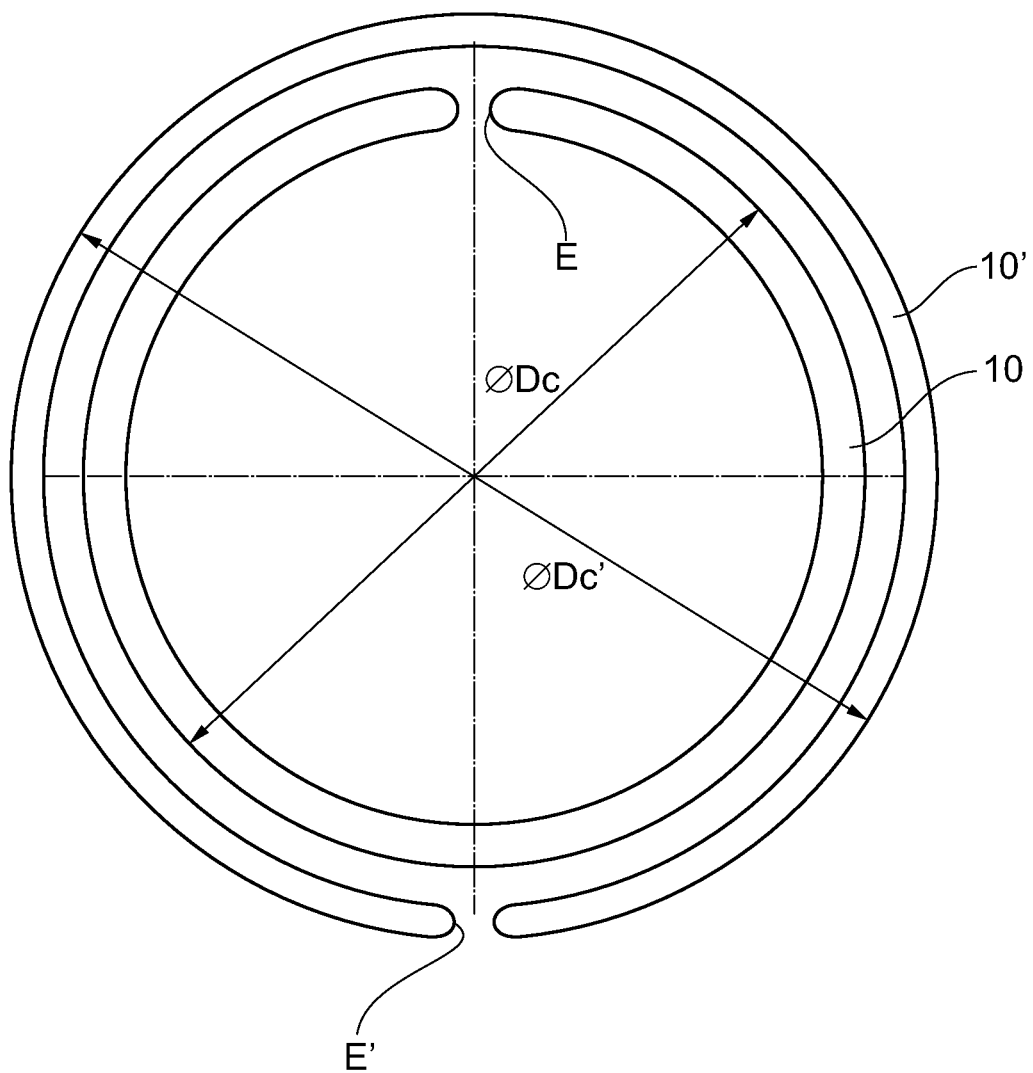
FIG. 7 is a top view of the two diaphragm seals of FIG. 6.

FIG. 6 is a cross sectional view of strut bearing 1' according to another embodiment of the invention, similar to that disclosed in FIG. 1, however, in this embodiment, upper housing 2' has multiple seal annuli 30, 30', and multiple shield extensions, 23, 23', shield extension 23 separating multiple seals 10, 10' from each other. In addition, lower housing radial ledge 24' is extended to account for the additional seal and annulus. Although seals 10 and 10' can be inserted in multiple configurations, FIG. 7 shows a preferred configuration, wherein end E and E' are 180 opposed, such that leakage or contamination ingress at ends E or E' is limited.

In the foregoing description, example embodiments are described. The specification and drawings are accordingly to be regarded in an illustrative rather than in a restrictive sense. It will, however, be evident that various modifications and changes may be made thereto, without departing from the broader spirit and scope of the present invention.

In addition, it should be understood that the figures illustrated in the attachments, which highlight the functionality and advantages of the example embodiments, are presented for example purposes only. The architecture or construction of example embodiments described herein is sufficiently flexible and configurable, such that it may be utilized (and navigated) in ways other than that shown in the accompanying figures.

Although example embodiments have been described herein, many additional modifications and variations would be apparent to those skilled in the art. It is therefore to be understood that this invention may be practiced otherwise than as specifically described. Thus, the present example embodiments should be considered in all respects as illustrative and not restrictive.

LIST OF REFERENCE SYMBOLS

1 Strut Bearing
2 Upper Housing
3 Lower Housing
4 Races
5 Balls
6 Cage
10 Diaphragm Seal
20 Rod
20' Through hole (upper housing)
20" Through hole (lower housing)
21 Inner sleeve
22 Upper radial ledge
23 Shield extension
24 Lower radial ledge
25 Upper clip
25' Upper clip flange
26 Lower clip
27 Upper projection
27' Upper projection end face
28 Lower projection
30 Cylindrical annulus
32 Radially inner sidewall
35 Interior cavity
100 Bearing

What we claim is:

1. A strut bearing assembly comprising:
   an upper housing having a through hole for accommodating a rod of a strut,
   and at least one upper annulus formed at an outer radial perimeter;
   a lower housing having a through hole for accommodating a rod of a strut,
   and at least one lower annulus formed at an outer radial perimeter;
   the upper housing superimposed on the lower housing such that the through holes and annuli align, the at least one upper and lower annuli forming at least one sealing annulus extending around an entire periphery of the assembly;
   the at least one sealing annulus having a radially inner wall, a radially outer wall, an axial upper ledge extending radially outward between the inner and outer walls and an axial lower ledge extending radially outward between the inner and outer walls;
   a hollow flexible tubular ring seal inserted into the sealing annulus, the seal contacting at least the axial upper ledge at an upper surface of the seal and the lower ledge at a lower surface of the seal;
   the seal extending at least around 270 degrees of the sealing annulus; and
   the seal rolling along a length thereof as a result of relative rotation between the upper and lower housings.

2. The strut bearing of claim 1, wherein the at least one seal is formed of an elastomer.

3. The strut bearing of claim 1, wherein the at least one seal is filled with a gas.

4. The strut bearing of claim 1, wherein the at least one seal is filled with a liquid.

5. The strut bearing of claim 1, wherein the seal volume is compressed during assembly in the range of 5% to 95%.

6. The strut bearing of claim 1, wherein the at least one seal is non-continuous.

7. The strut bearing of claim 1, wherein, the at least one sealing annulus is two annuli formed around the entire periphery of the assembly and a tubular ring seal inserted into each of the two annuli.

8. The strut bearing of claim 7, wherein the two ring seals are non-continuous.

* * * * *